United States Patent Office 3,769,206
Patented Oct. 30, 1973

3,769,206
METHOD FOR ELIMINATING COLOR DEVELOPER FOG
Jesse L. Brown and Lynn R. Hotter, Rochester, N.Y., assignors to Eastman Kodak Company, Rochester, N.Y.
No Drawing. Filed Jan. 5, 1972, Ser. No. 215,635
Int. Cl. B01d 13/00
U.S. Cl. 210—22                                              4 Claims

ABSTRACT OF THE DISCLOSURE

It has been discovered that fog induced by color developer solutions which include a sulfite ion antioxidant, a hydroxylamine stabilizer and a salt of an amino polycarboxylic acid as a heavy metal sequestering agent can be eliminated by treating the color developer solution with an ammonia scavenger for example, a biological scavenger such as an enzyme and particularly carbamoyl phosphate synthetase and transamminase enzymes found in activated yeast, or a chemical scavenger such as boric acid or acetaldehyde, protected by a membrane selectively permeable to ammonia and stable at pHs above about 8.0. The technique described herein is equally effective for deammoniating other aqueous alkaline ammoniacal solutions.

FIELD OF THE INVENTION

The present invention relates to a technique for successfully scavenging ammonia from an aqueous alkaline solution, and more specifically to a technique for removing fog inducing amounts of ammonia from color developer solutions which include a sulfite ion antioxidant, a hydroxylamine salt stabilizer and a salt of an amino polycarboxylic acid as a complexing or sequestering agent for heavy metal ions.

BACKGROUND OF THE INVENTION

The problem of ammonia induced fogging particularly in the color development of paper light sensitive photographic products is well known in the art. Fogging generally occurs as a cyan stain due to the arrangement of the dye layers in a reflection image paper product and is probably most aggravating and apparent when color developers which include a sulfite ion antioxidant, a hydroxylamine salt (i.e. sulfate) stabilizer and an amino polycarboxylic acid heavy metal ion sequestering agent are used to process these materials. For reasons which are not perfectly clear at this time, it appears that in this system the hydroxylamine salt stabilizer instead of decomposing into harmless nitrogen gas undergoes a decomposition which results in the formation of approximately 90% by weight $N_2$ and approximately 10% by weight ammonia or $NH_3$ gas. It is this latter decomposition product which attacks unexposed silver halide in the outermost layer of exposed sensitized materials processed through the solution to produce fogging.

It is therefore an object of the present invention to provide a method for treating solutions which produce ammonia induced fog to eliminate this tendency to fogging, and even more generally to provide a simple, economical, clean and efficient technique for de-ammoniating aqueous alkaline ammoniacal solutions.

SUMMARY OF THE INVENTION

It has now been discovered that ammonia gas can be scavenged from an aqueous alkaline solution by contacting the aqueous alkaline solution with one surface of an ammonia permeable membrane whose opposing surface is accessible to an ammonia scavenger, for example, a biological scavenger such as an acid acting enzyme and preferably transammainase or carbamoyl phosphate synthetase as found in activated yeast, or a chemical scavenger, i.e. acetaldehyde, or boric acid.

DETAILED DESCRIPTION OF THE INVENTION

According to the present invention the ammonia present in any ammonical solution and in particular color developer solutions of the type just described can be removed in a clean and efficient manner by treating the solution in one fashion or another with an ammonia scavenger which is separated from the ammoniacal solution by an ammonia permeable membrane. Thus, ammonia gas is permitted to penetrate the membrane and is consumed by either a biological (enzyme) or chemical scavenger.

The particular membrane material used to separate the ammoniacal solution to be treated from the ammonia scavenger during the scavenging operation can, of course, vary broadly across the scale of such materials which are available and almost any membrane mateiral which will permit the passage of ammonia in at least one direction while inhibiting substantally the passage of the scavenging medium therethrough in the opposite direction will be useful for this purpose. Certain other limitations can and are, of course, imposed by the specific environment in which the membrane is being used. Thus, for example in the preferred embodiment of the present invention the color developer solution from which it is sought to scavenge the ammonia is relatively highly caustic, i.e. it has a pH above about 8.0, preferably above about 9.5, and often above about 10.0. Thus, the membrane used in this type of system must be resistant to attack by the caustic medium. It has been found, therefore, useful to use as the contacting medium a membrane, i.e. a semipermeable polymeric film having a thickness of from about 0.0005 to about 0.005 inch and preferably between about 0.001 and 0.002 inch, composed of a polyolefin i.e. polyethylene or polypropylene which is inert to the caustic medium being treated. Specifically perferred among this class of semipermeable polymeric films are those of low density polyethylene which demonstrate substantially no permeability to water at 150 p.s.i. Of course, other useful membranes which are permeable to ammonia and which are known and available to the skilled artisan could also be used for this purpose, and other characteristics of such materials will be defined more fully below. Generally, however, for purposes of the instant invention any membrane material of any thickness which permits passage of the ammonia therethrough in at least one direction while simultaneously inhibiting passage of the scavenging medium in the opposite direction will be satisfactory. Certain limitations will, of course, be imposed by virtue of the time available for de-ammoniation to occur and these will be determined by the results desired and not by any limitations in the technique described herein.

The ammonia scavenger which is made available to the surface of the membrane opposing that which contacts the ammoniacal solution to be treated may also vary within broad limits. Thus, enzymes which utilize ammonia in relatively large quantities in their catalyzed reactions form a broad class of useful ammonia scavengers both from the point of view of their ability to "devour" i.e. use up ammonia and their polymeric proteinaceous structure (or the structure of their substrates) which makes them relatively easy to retain behind a membrane through which ammonia may pass with little difficulty. Particularly useful materials for this purpose by virtue of their availability and relatively low cost are the carbamoyl phosphate synthetase and transamminase enzymes present in activated yeast and "enzyme detergents" which, when dissolved in water are capable of scavenging several times their weight in ammonia gas. Such materials are well known to the skilled artisan and are readily and commercially available. Equally useful for scavenging ammonia, however, somewhat less desirable for this purpose for the reasons expressed below are the chemical scavengers such as boric acid, acetaldehyde etc. Although very effective as scavengers, organic solvents such as acetaldehyde do have the distinct draw-back that due to their relatively high vapor pressures they are relatively easily diffused as gases through a semipermeable membrane and hence retention thereof on the correct side of the membrane during the scavenging operation may be somewhat more difficult. They are, however, useful in systems of the type described below the scavenger is not in direct contact with the membrane but is removed therefrom some small distance.

When an enzyme is used as the ammonia scavenger it is desirable to dissolve the enzyme in water and to contact this solution directly with the surface of the membrane opposing that which is contacted with the ammoniacal solution. It may also be desirable to enlarge the surface area of the enzyme solution which is in contact with the membrane to the greatest degree possible within reason so that the ammonia scavenging capability of the enzyme can be put to maximum usage. A reduction in the surface area of the enzyme solution contacted with the surface of the membrane opposing that which contacts the ammoniacal solution will not adversely affect the scavenging capability of the enzyme but will merely reduce the rate of scavenging because of the reduced surface area of scavenger available.

The physical arrangements which can be used to actually "de-ammoniate" aqueous alkaline ammoniacal solutions according to the method described herein are limited only by the imagination of the user which can define innumerable manners in which to bring the ammoniacal solution in contact with the ammonia permeable membrane so that scavenging may occur. In the case of enzyme scavenger one generally desirable technique is to dissolve the enzyme or suspend the enzyme containing yeast in water, partially or completely fill a "pouch" or bag formed by the semipermeable membrane with this mixture and to insert it physically into the aqueous ammoniacal medium. The larger the surface area of the scavenging medium exposed to the ammonia transmitting membrane, the higher will be the rate of scavenging over a given period of time. According to this embodiment, the enzyme solution within the membrane pouch is suspended in the ammoniacal solution and ammonia passing through the membrane is scavenged by the enzyme in direct contact with the opposing membrane surface.

According to an alternative embodiment the solution on the opposing side of the membrane is an aqueous solution of a chemical scavenger such as acetaldehyde or of boric acid. In this case, due to the propensity of the scavenger to diffuse through the membrane, a portion of the scavenger solution may be removed some small distance from the surface of the membrane since the ammonia can pass through the membrane at some point removed from the scavenger liquid as a gas and yet be substantially removed from the atmosphere above the scavenging solution. To insure that no scavenger migrates into the ammoniacal solution, it may be desirable that the scavenger not contact the surface of the membrane at all, but actually be entirely removed some small distance therefrom so that ammonia passing through the membrane from the solution enter the atmosphere above the scavenger from whence it is removed.

Other alternative physical arrangements for achieving "de-ammoniation" will of course occur to the skilled artisan. Among these might be a continuous scavenging system in which the ammoniacal solution is passed under positive pressure through a tube surrounded by a scavenger solution; the use of a solution tank, one of whose walls has a membrane portion which provides access to a scavenging medium, etc.

Among the many solutions which may be de-ammoniated using the technique described above are color develper solutions which contain a p-phenylenediamine color developing agent, sulfite ion as an antioxidant, a hydroxylamine salt e.g. hydroxylamine sulfate and an amino polycarboxylic acid heavy metal sequestering agent, as described above, such solutions spontaneously generate ammonia due to a decomposition of the hydroxylamine component. The use of the technique of the instant invention to de-ammoniate solutions of this type is demonstrated most clearly in the examples below. When solutions of this type are de-ammoniated using the technique described herein it is generally desirable due to the batch nature of these systems to use the "pouch" technique for de-ammoniating. Thus, one or more pouches of scavenger can be placed in the developer bath during periods of non-use, i.e. nights and weekends and in this fashion the concentration of ammonia can be maintained at an acceptable level. A similar technique can be used to maintain ammonia concentrations at acceptable levels during the developing operation.

Evaluation of color developers for paper photographic materials indicates that an ammonia concentration of below about 20 p.p.m. does not produce any undesirable level of fogging in conventional sensitized materials. Optimum results are achieved at levels below about 15 p.p.m. of ammonia. Thus, as shown in the examples below, the user of this technique can readily reduce the concentration of ammonia in his developer system from a level of about 50 p.p.m., a level which can be achieved after only a few hours of standing time preceded by a few hours of heavy usage, to an acceptable level below about 12 p.p.m. merely by placing several semipermeable membrane enclosed units of scavenger in his bath overnight or over a weekend.

The following examples will serve to better demonstrate the practice of the present invention.

Example 1

A color developer solution prepared by mixing together 5 grams hydroxylamine sulfate, 3 grams diaminoproponal tetraacetic acid, 2 grams sodium sulfite and 5 grams of color developing agent ($\alpha$-amino-N-ethyl-N-[B-methanesulfonamidoethyl] - m - toliundine sesquisulfate monohydrate) in enough water to give one liter of solution was buffered to a pH of $10.0 \pm .05$ at 80° F.

Example 2

The solution prepared in Example 1 was analyzed for ammonia content after treatment under varying conditions as described below.

(1) Freshly prepared developer less than 2 hours old.

(2) Freshly prepared developer less than 2 hours old having suspended therein from making 2 ounces of activated yeast dissolved in 50 ml. of water in a low density polyethylene bag having substantially no permeability to water at 1500 p.s.i.

(3) Freshly prepared developer heated for two hours at 120° F.

(4) Freshly prepared developer heated for two hours at 120° F., but having suspended therein a quantity of activated yeast as described in sample 2.

(5) Freshly prepared developer heated overnight at 120° F.

(6) Sample similar to 2 and 4 above, but heated overnight at 120° F.

The ammonia content of each of these samples was as follows:

| Sample No.: | $MgNH_3$/liter of solution |
|---|---|
| 1 | 43 |
| 2 | 21 |
| 3 | 82 |
| 4 | 26 |
| 5 | 95 |
| 6 | 7 |

From the foregoing it seems perfectly clear that the technique described herein for reducing the concentration of ammonia in the color developer system is effective as the samples which were treated according to the method of the present invention (Nos. 2, 4 and 6) had significantly lower ammonia levels than their untreated counterparts.

In the case where enzymes are used as the ammonia scavenger, increasing the temperature increases the rate at which ammonia scavenging occurs. Care should of course be exercised that the temperature of the scavenging solution is not raised above about 95–100° F. since at this temperature the enzymes decompose and lose their catalytic activity. In the case where activated yeast is used as the source of the transamminase enzyme the temperature is preferably maintained below about 95° F.

With the foregoing possible exceptions there are no critical temperature limitations involved in the successful practice of the instant invention. Of course as the temperature of the ammoniacal solution rises ammonia production and evolution will increase as will the pressure of same against the polymeric film, however, these effects serve only to accelerate or decelerate ammonia scavenging and do not significantly affect the method of the instant process.

The period of time for which the user of this method contacts the ammoniacal solution with the membrane cannot, of course, be defined with any specificity, since the period of contact will depend upon such variables as the initial concentration of ammonia in the solution being treated, the final concentration of ammonia to be achieved, the rate at which ammonia is produced in the solution even during the scavenging operation, the "porosity" of the polymeric film to ammonia, etc. Thus, the time of treatment will be largely a function of the user's particular system and plays no critical role in the successful practice of the invention.

The invention has been described in detail with particular reference to preferred embodiments thereof but it will be understood that variations and modifications can be effected within the spirt and scope of the invention as described hereinabove and as defined in the appended claims.

We claim:

1. A method for reducing the concentration of ammonia in an aqueous alkaline ammoniacal photographic color developer solution comprising a p-phenylenediamine color developing agent, a sulfite ion antioxidant, a hydroxylamine salt and an amino polycarboxylic acid heavy metal ion sequestering agent, said method comprising the step of contacting said aqueous alkaline ammoniacal solution with one surface of an ammonia permeable membrane whose opposing surface is accessible to an ammonia scavenger for a period of time sufficient to permit at least some of the ammonia to pass through the membrane and be consumed by the ammonia scavenger, said membrane being a polyolefin film stable at a pH above 8.0 which is permeable to ammonia but impermeable to said ammonia scavenger.

2. The method of claim 1 wherein said membrane comprises low density polyethylene having substantially no porosity to water at a pressure of 1500 p.s.i.

3. The method of claim 1 wherein said ammonia scavenger is a biological scavenger.

4. The method of claim 1 wherein said ammonia scavenger is selected from the group consisting of transamminase, carbamoyl phosphate synthetase, acetaldehyde, and boric acid.

References Cited

UNITED STATES PATENTS 3,608,729   9/1971   Haselden _____ 210—321

FOREIGN PATENTS 709,179   5/1954   Great Britain _____ 210—22

FRANK A. SPEAR, JR., Primary Examiner

U.S. Cl. X.R.

210—321

PO-1050
(5/69)

UNITED STATES PATENT OFFICE
CERTIFICATE OF CORRECTION

Patent No. 3,769,206          Dated October 30, 1973

Inventor(s) Jesse L. Brown and Lynn R. Hotter

It is certified that error appears in the above-identified patent and that said Letters Patent are hereby corrected as shown below:

Column 2, line 1, "transammainase" should read --transamminase--.
Column 2, line 42, "150" should read --1500--.  Column 3, line 13, after "below" insert --where--.  Column 4, line 26 "abaut" should read --about--.  Column 4, line 43 "toliundine" should read --toluidine--.

Signed and sealed this 23rd day of April 1974.

(SEAL)
Attest:

EDWARD M.FLETCHER,JR.                    C. MARSHALL DANN
Attesting Officer                         Commissioner of Patents